United States Patent
Army et al.

(10) Patent No.: US 12,214,887 B2
(45) Date of Patent: Feb. 4, 2025

(54) ENVIRONMENTAL CONTROL SYSTEM INCLUDING HUMIDITY SENSOR

(71) Applicant: Hamilton Sundstrand Corporation, Charlotte, NC (US)

(72) Inventors: Donald E. Army, Enfield, CT (US); John M. Maljanian, Farmington, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 415 days.

(21) Appl. No.: 17/585,791

(22) Filed: Jan. 27, 2022

(65) Prior Publication Data
US 2023/0234710 A1 Jul. 27, 2023

(51) Int. Cl.
*B64D 13/06* (2006.01)

(52) U.S. Cl.
CPC ...... *B64D 13/06* (2013.01); *B64D 2013/0648* (2013.01); *B64D 2013/0662* (2013.01)

(58) Field of Classification Search
CPC .... B64D 2013/0662; B64D 2013/0648; B64D 13/06
USPC .......................................................... 454/76
See application file for complete search history.

(56) References Cited

U.S. PATENT DOCUMENTS

| | | | |
|---|---|---|---|
| 4,836,019 A | 6/1989 | Hagen et al. | |
| 5,046,360 A | 9/1991 | Hedberg | |
| 5,337,602 A | 8/1994 | Gibson | |
| 6,199,387 B1 | 3/2001 | Sauterleute | |
| 6,813,942 B1 | 11/2004 | Vozhdaev et al. | |
| 6,901,814 B2 | 6/2005 | Vozhdaev et al. | |
| 7,543,759 B2 | 6/2009 | George | |

(Continued)

FOREIGN PATENT DOCUMENTS

| | | |
|---|---|---|
| EP | 1386837 A1 | 2/2004 |
| EP | 3190419 A1 | 7/2017 |

OTHER PUBLICATIONS

Andivi, "What type of humidity sensor you should choose?" [online]; [retrieved on Jan. 10, 2022]; retrieved from the Internet: https://www.andivi.com/humidity-sensor-what-type-should-you-choose/, 22 pages.

(Continued)

*Primary Examiner* — Avinash A Savani
*Assistant Examiner* — Dana K Tighe
(74) *Attorney, Agent, or Firm* — CANTOR COLBURN LLP

(57) ABSTRACT

An environmental control system of an aircraft includes a primary heat exchanger, a secondary heat exchanger and an air cycle machine. The air cycle machine includes a compressor fluidly coupled to an outlet of the primary heat exchanger and an inlet of the secondary heat exchanger, a dehumidification system arranged in fluid communication with the outlet of the secondary heat exchanger, a first turbine fluidly coupled to an outlet of the secondary heat exchanger and optionally a second turbine disposed downstream of the first turbine that receives air from the first turbine in a normal mode a first humidity sensor disposed fluidly between the first turbine and the second turbine that measures humidity of air that has left the first turbine as it enters the second turbine in the normal mode.

18 Claims, 3 Drawing Sheets

(56) References Cited

U.S. PATENT DOCUMENTS

| | | |
|---|---|---|
| 9,207,253 B2 | 12/2015 | Seidel et al. |
| 9,664,542 B2 | 5/2017 | Gordon et al. |
| 9,719,423 B2 | 8/2017 | Motakef et al. |
| 9,724,979 B1 | 8/2017 | Thumati et al. |
| 9,791,304 B2 | 10/2017 | Wong et al. |
| 9,856,027 B2 | 1/2018 | Anderson et al. |
| 9,891,083 B2 | 2/2018 | Gordon et al. |
| 9,975,639 B2 | 5/2018 | Hodot et al. |
| 10,089,204 B2 | 10/2018 | Hare et al. |
| 10,458,342 B2 * | 10/2019 | Morgan ............... F02C 9/00 |
| 11,053,010 B2 * | 7/2021 | Bruno ............... B64D 13/06 |
| 11,080,660 B2 | 8/2021 | Sundareswara et al. |
| 11,148,813 B2 * | 10/2021 | Shea ............... B64D 13/08 |
| 11,260,346 B2 * | 3/2022 | Rheaume ............ B01D 53/265 |
| 2013/0145862 A1 | 6/2013 | Leblond et al. |
| 2015/0059397 A1 | 3/2015 | Bruno et al. |
| 2016/0280391 A1 | 9/2016 | Golly et al. |
| 2016/0302259 A1 | 10/2016 | Sarno et al. |
| 2016/0304210 A1 | 10/2016 | Wentland et al. |
| 2017/0101190 A1 | 4/2017 | Anderson et al. |
| 2017/0267358 A1 | 9/2017 | Sun et al. |
| 2018/0259548 A1 | 9/2018 | Anderson et al. |
| 2020/0087769 A1 | 3/2020 | Jacob et al. |
| 2020/0180772 A1 | 6/2020 | Richardson et al. |
| 2020/0233007 A1 | 7/2020 | Jacob et al. |
| 2021/0333099 A1 | 10/2021 | Zhu et al. |

OTHER PUBLICATIONS

Bosch, [online]; [retrieved on Jan. 10, 2022]; retrieved from the Internet: https://www.bosch-sensortec.com/products/environmental-sensors/gas-sensors/bme680/, 6 pages.

Texas Instruments, [online]; [retrieved on Jan. 10, 2022]; retrieved from the Internet: https://www.ti.com/sensors/humidity-sensors/overview.html, 3 pages.

Chowdhury Shafayat Hasan et al. "A Methodology for the Experimental Validation of an Aircraft ECS Digital Twin Targeting System Level Diagnostics", Annual Conference of the PHM Society, [online], vol. 11, No. 1, Sep. 22, 2019.

European Office Action for European Application No. 20152036.8; dated Aug. 30, 2022; 7 pages.

European Search Report for European Application No. 20152036.8; dated Jun. 6, 22, 2020; 10 pages.

European Search Report for European Application No. 23153795.2; dated Jun. 6, 2023; 13 pages.

* cited by examiner

ENVIRONMENTAL CONTROL SYSTEM INCLUDING HUMIDITY SENSOR

BACKGROUND

Exemplary embodiments pertain to the art of environmental control systems and, in particular, to environmental control systems (ECS) that include a humidity sensor.

Water removal from, or dehumidification of, airflow is one of the primary functions of aircraft ECSs. Traditionally, the water removal has been done via a high pressure water collector or via low pressure water separation.

In high pressure water collection, water is condensed out of the air by reducing temperature on the air while the air is in a high pressure condition, prior to any turbine expansion. Lowering temperature on the air is accomplished through heat exchangers typically known as a condenser and sometimes also a reheater, where the hot side is the hot, humid high pressure air and the cold side is the cold air that has been dehumidified and has undergone turbine expansion.

In low pressure water separation, water is condensed via turbine expansion prior to the air exiting the pack. The water coming off the turbine is often a very fine mist with a very small droplet size that would be difficult to gather using centrifugal forces and inertia alone. Therefore, water is coalesced into larger droplets with a cloth mesh filter prior to the water collecting can. This mesh is more burdensome because it needs regular schedule maintenance and the size of the water collecting can is also substantially bigger in order to lower air velocities such that any free moisture can be efficiently collected.

In some cases water is separated using both high and low pressure separation. This can happen, for example, in systems that include two turbines.

The management of free water within an ECS is particularly challenging in that the current art protective controls must conservatively limit the modes of system operation thereby not fully utilizing the performance capabilities of the system.

BRIEF DESCRIPTION

Disclosed is an environmental control system of an aircraft. The system includes: a primary heat exchanger; a secondary heat exchanger; and an air cycle machine. The air cycle machine includes: a compressor fluidly coupled to an outlet of the primary heat exchanger and an inlet of the secondary heat exchanger; a dehumidification system arranged in fluid communication with the outlet of the secondary heat exchanger; a first turbine fluidly coupled to an outlet of the secondary heat exchanger; a second turbine disposed downstream of the first turbine that receives air from the first turbine in a normal mode; and a first humidity sensor disposed fluidly between the first turbine and the second turbine that measures humidity of air that has left the first turbine as it enters the second turbine in the normal mode.

In addition to one or more of the features described above, or as an alternative to any of the foregoing embodiments, the system can further include a second humidity sensor disposed fluidly between the secondary heat exchanger and the dehumidification system that measures humidity of air that has left the compressor before it enters the dehumidification system.

In addition to one or more of the features described above, or as an alternative to any of the foregoing embodiments, the dehumidification system includes a condenser and a water extractor, and moisture is removed from air before entering the first turbine in the normal mode.

In addition to one or more of the features described above, or as an alternative to any of the foregoing embodiments, the system further includes a second humidity sensor disposed fluidly between the secondary heat exchanger and the dehumidification system that measures humidity of air that has left the compressor before it enters the dehumidification system.

In addition to one or more of the features described above, or as an alternative to any of the foregoing embodiments, air exiting the first turbine passes through the condenser before entering the second turbine.

In addition to one or more of the features described above, or as an alternative to any of the foregoing embodiments, the first humidity sensor includes an inlet and an exhaust, and/or the second turbine receives the air via a second turbine inlet, and/or the inlet is connected to the second turbine inlet such that air is directed from the second turbine inlet through the first humidity sensor to the exhaust.

In addition to one or more of the features described above, or as an alternative to any of the foregoing embodiments, the exhaust is connected to an output of the second turbine.

In addition to one or more of the features described above, or as an alternative to any of the foregoing embodiments, the exhaust is connected to an ambient environment.

In addition to one or more of the features described above, or as an alternative to any of the foregoing embodiments, the exhaust includes an exhaust orifice disposed therein that controls a rate of flow through the first humidity sensor.

In addition to one or more of the features described above, or as an alternative to any of the foregoing embodiments, the system can further include a bypass valve that diverts air around the dehumidification system such that air exiting the first turbine can enter the second turbine without passing though the dehumidification system when in a bypass mode. In some cases, the first humidity sensor is downstream of the bypass valve.

Also disclosed is an environmental control system of an aircraft that includes an air cycle machine (ACM) with a first turbine but not the second. In particular, the environmental control system of this second embodiment includes: a primary heat exchanger; a secondary heat exchanger; and an air cycle machine. The ACM includes: a compressor fluidly coupled to an outlet of the primary heat exchanger and an inlet of the secondary heat exchanger; a dehumidification system arranged in fluid communication with the outlet of the secondary heat exchanger; a first turbine fluidly coupled to an outlet of the dehumidification system; and a humidity sensor disposed fluidly between second heat exchanger and the first turbine that measures humidity of air as it enters the first in the normal mode.

In addition to one or more of the features described above, or as an alternative to any of the foregoing embodiments, the dehumidification system includes a condenser and a water extractor, and moisture is removed from air before entering the first turbine in the normal mode.

In addition to one or more of the features described above, or as an alternative to any of the foregoing embodiments, the second system can further includes a second humidity sensor disposed fluidly between the secondary heat exchanger and the dehumidification system that measures humidity of air that has left the compressor before it enters the dehumidification system.

In addition to one or more of the features described above, or as an alternative to any of the foregoing embodiments, the second system can have air exiting the first turbine pass through the condenser as it leaves the first turbine.

In addition to one or more of the features described above, or as an alternative to any of the foregoing embodiments, the second system humidity sensor includes an inlet and an exhaust, and/or the first turbine receives the air via a first turbine inlet, and/or the inlet is connected to the first turbine inlet such that air is directed from the first turbine inlet through the first humidity sensor to the exhaust.

In addition to one or more of the features described above, or as an alternative to any of the foregoing embodiments, in the second system the exhaust is connected to an output of the first turbine or to ambient.

In addition to one or more of the features described above, or as an alternative to any of the foregoing embodiments, in the second system the exhaust includes an exhaust orifice disposed therein that controls a rate of flow through the first humidity sensor.

In addition to one or more of the features described above, or as an alternative to any of the foregoing embodiments, the second system can further include a bypass valve that diverts air around the dehumidification system such that air exiting the secondary heat exchanger can enter the first turbine without passing though the dehumidification system when in a bypass mode. The first humidity sensor is downstream of the bypass valve.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
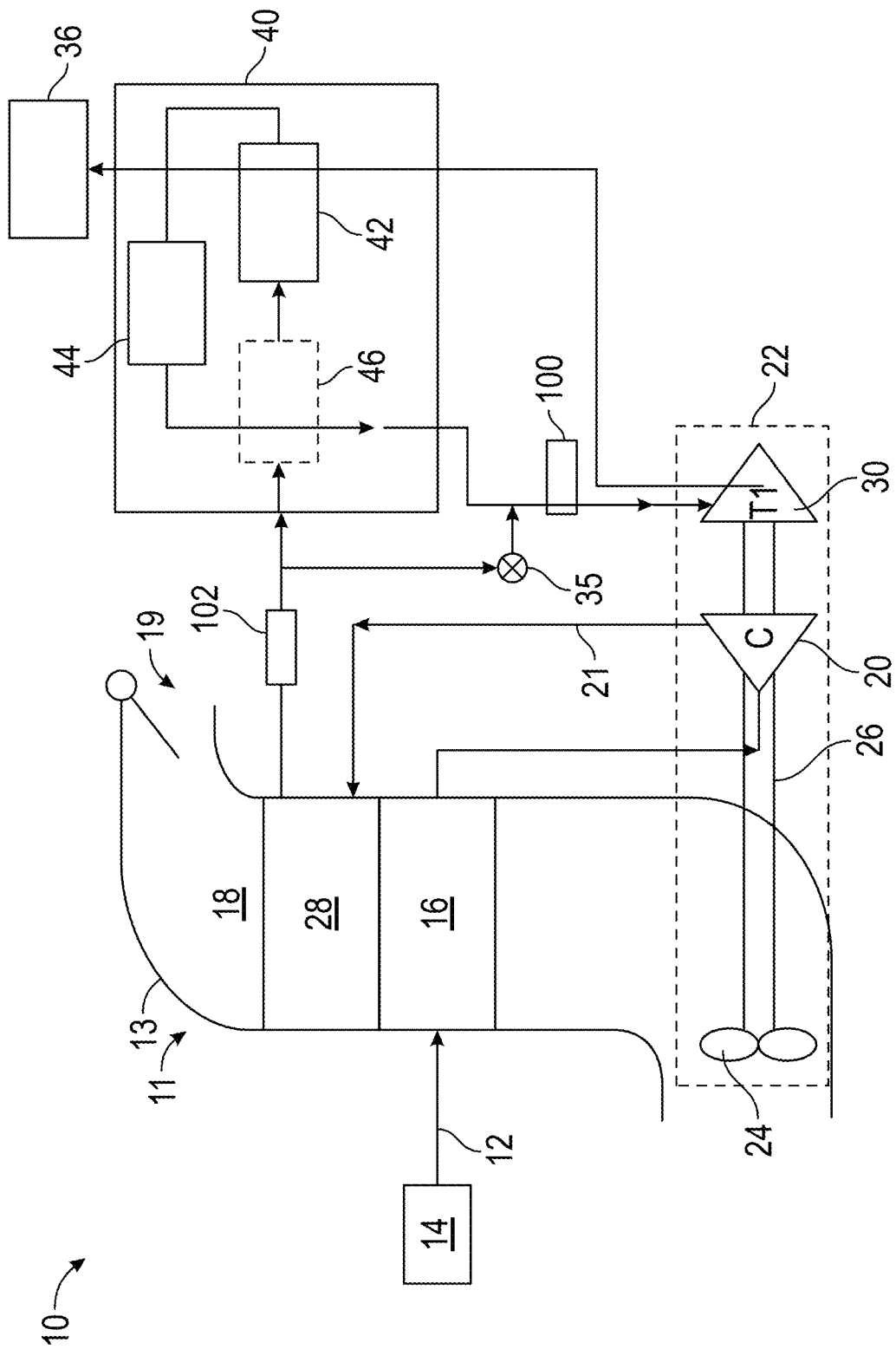
FIG. 1 is a schematic showing an ECS with a humidity sensor according to one embodiment.

Referring now to FIG. 1, illustrated is an embodiment of an environmental control system (ECS) 10 for an aircraft. The ECS 10 is supplied with, for example, bleed airflow 12 from a bleed air supply system 14 of a gas turbine engine.

The environmental control system (ECS) 10 includes a RAM air circuit 11 including a shell or duct 13 within which one or more heat exchangers are located. The shell 13 can receive and direct a medium, such as ram air flow 18 for example, through a ram inlet 19.

The one or more heat exchangers 16, 28 are devices built for efficient heat transfer from one medium to another. Examples of the type of heat exchangers that may be used, include, but are not limited to, double pipe, shell and tube, plate, plate and shell, adiabatic shell, plate fin, pillow plate, and fluid heat exchangers.

The bleed airflow 12 is input into a primary heat exchanger 16 of the ECS 10 where the bleed airflow 12 exchanges thermal energy with a RAM airflow 18, or alternatively ambient airflow. The bleed airflow is then directed through a compressor 20 of an air cycle machine 22. The compressor 20 and fan 24 are driven by, for example, turbine 30 that shares a common shaft 26 with the compressor 20 and fan 24. After compression at the compressor 20, the compressed bleed airflow 21 is directed to a secondary heat exchanger 28 where the compressed bleed airflow is cooled by thermal energy exchange with the RAM airflow 18. The bleed airflow 12 is then directed towards an expansion device 30 connected to the shaft 26 for primary expansion.

As shown, the system includes at least one expansion device 30. The expansion device 30 will also be referred to as a turbine or the first turbine herein.

The turbine 30 a mechanical device that includes components for performing thermodynamic work on air that leaves the compressor 20 (e.g., extracts work from or applies work to the compressed air by raising and/or lowering pressure and by raising and/or lowering temperature) and is used to drive the shaft 26 and thereby drive the fan 24 and the compressor 20.

As illustrated, before being provided to the turbine 30, the compressed air is passed through a dehumidification/water removal system 40. This system is described as being part of the ACM for simplicity, but it shall be understood that any system 40 connected to a ACM such as ACM 22 shall be considered part of the ACM whether integrated with the ACM or implemented as a separate unit. This is applicable to all embodiments herein.

In the illustrated, non-limiting embodiment the dehumidification system 40 includes a condenser 42, an optional reheater, and a water collector 44. The condenser 42 is a particular type of heat exchanger and the water collector 44 is a mechanical device that performs a process of removing water from a medium. In an embodiment, the water collector 44 is a high pressure water separator that removes moisture from a medium at a highest pressure within the environmental control system 10 (e.g., downstream of the compressor 20 and ram air heat exchanger 28). In an embodiment, the dehumidification system 40 further includes a reheater 46. The reheater 46 is another type of heat exchanger configured to increase the temperature of the air as it passes there through. The reheater 46 may be arranged generally upstream from the condenser 42 such that compressed air exiting secondary heat exchange 28 flows through the reheater 46 and then the condenser 42 sequentially.

The air is then directed to the turbine 30 for expansion. After expansion, the air it then again directed through the condenser 42 and then into the cabin 36 or overboard. The above discussion has described operation in a normal or first mode.

As illustrated, the ECS 10 can also include a bypass or economy valve (ECV) 35. When the ECV 35 is open, the air output from the ram air heat exchanger 38 has a temperature and pressure sufficient to meet the demands of the one or more loads, such as the cabin 36 for example. Herein, when ECV 35 is open, the system is said to be operating in a bypass mode. Accordingly, all or at least a portion of air output from the ram air heat exchanger 28 is configured to bypass including the dehumidification system 40 but not the turbine 30 in order to drive the compressor 20.

In embodiments herein, a humidity sensor 100 is provided upstream of the turbine 30. As illustrated, the humidity sensor 100 is directly upstream of the turbine 30 and downstream of the ECV 35. In one embodiment, this humidity sensor 100 is the only sensor in the ECS 10. In such an embodiment, the sensor 100 can be said to be in the "turbine inlet location." Measuring humidity in such a position allows the ECS controls to minimize the risk of rotor icing effects in the turbine 30 (e.g. reduce ACM speed or raise turbine inlet temperature if required).

In prior systems, there was no directly measured humidity. Rather, only temperature and/or pressure was used to approximate it. It should be understood that the humidity sensor 100 (or any other humidity sensor herein, e.g., sensor 102 below) can be an integrated circuit (IC) sensor that can measure one or both temperature and pressure as well. This can simplify wiring in the system and may allow for a reduction in the number of separate sensors. More importantly, advanced ECV opening logic based on measured humidity can be utilized, further optimizing system performance. Also, knowing humidity values may help in root cause failure analyses for the ECS components.

Figure 2A:
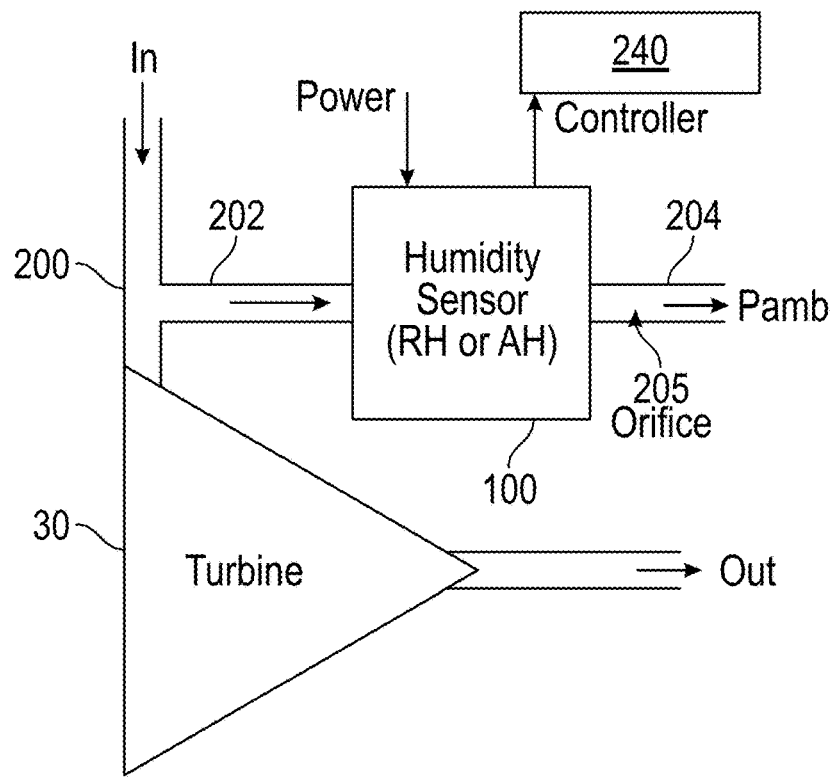
FIGS. 2A and 2B show different configurations of how a humidity sensor can be connected in an ECS relative to a turbine and is applicable to all embodiments.
Figure 2B:
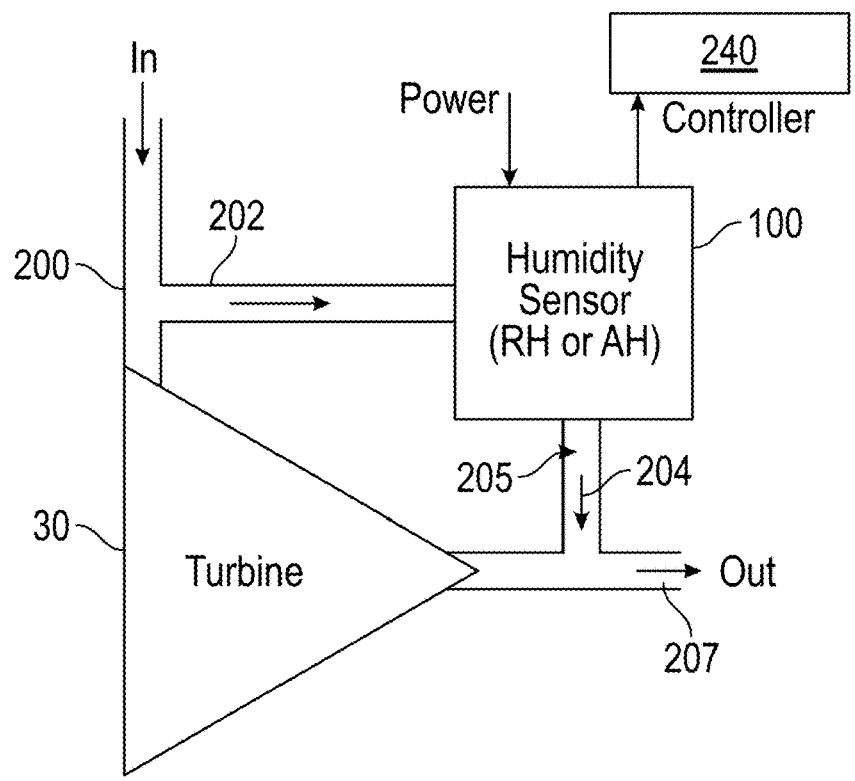

Reference is now made to FIGS. 2A and 2B that show two different installations that may be used when measuring humidity. In FIG. 2A, the turbine 30 is shown as having an inlet pipe 200. The humidity sensor 100 can divert a small portion the air provided to the turbine 30 via an inlet and an outlet. The inlet is shown as measuring bypass channel 202. The bypass channel 202 passes through the sensor 100 providing air to the sensor for measurements.

After being measured, the air exits the sensor 100 via an outlet shown as exhaust 204. The rate of flow through the sensor can be controlled by an exhaust orifice 205 in the exhaust 204. The orifice can be fixed or adjustable. As shown in FIG. 2A, the exhaust 204 can exhaust the air to an ambient environment. This environment can be overboard or the cabin, for example. As shown, the sensor 100 can receive power and can also provide data (measurements) to an ECS controller 240.

In FIG. 2B, the turbine 30 is shown as having an inlet pipe 200. The humidity sensor 100 can divert a small portion the air provided to the turbine 30 via a measuring bypass channel 202. The bypass channel 202 passes through the sensor 100 providing air to the sensor for measurements. As shown, the sensor 100 can receive power and can also provide data (measurements) to an ECS controller 240.

After being measured, the air exits the sensor 30 via exhaust 204. The rate of flow through the sensor can be controlled by an exhaust orifice 205 in the exhaust 204. The orifice can be fixed or adjustable. As shown in FIG. 2B, the exhaust 204 can be connected back to the outlet 207 of the turbine 30.

In the above discussion, only a single sensor has been shown. It shall be understood that one or more optional additional sensors can be provided. For example, in FIG. 1, an optional second humidity sensor 102 is shown upstream of the dehumidification system 40. As the skilled artisan will realize, having such a second sensor can provide one more advantages. In particular, having two sensors (in addition to the above advantages of a single sensor) can allow for performance measurements of the dehumidification system 40 and may further provide additional information for a root cause failure analysis. The location of sensor 102 can also provide the benefit of more accurately determining if moisture is present in the system and therefore utilize the water removal system only when required.

The above, examples are directed to systems that includes one turbine in the ECS. It is also applicable to other configurations. For example, as shown FIG. 3, the ECS 10 can include a pair of expansion devices 30 and 32. The expansion devices 30, 32 of the system 10, may, but need not be substantially identical. In general, as above, the expansion devices are turbines. Herein turbine 32 can be referred to as a second turbine.

The first and second turbines 30, 32 are both connected to the shaft 26 and, as above, are mechanical device that include components for performing thermodynamic work on air that leaves the compressor 20 (e.g., extracts work from or applies work to the compressed air by raising and/or lowering pressure and by raising and/or lowering temperature) and is used to drive the shaft 26 and thereby drive the fan 24 and the compressor 20.

As illustrated, before being provided to the first turbine 30, the compressed air is passed through the dehumidification/water removal system 40. In the illustrated, non-limiting embodiment the dehumidification system 40 includes a condenser 42, an optional reheater, and a water collector 44. The condenser 42 is a particular type of heat exchanger and the water collector 44 is a mechanical device that performs a process of removing water from a medium. In an embodiment, the water collector 44 is a high-pressure water separator that removes moisture from a medium at a highest pressure within the environmental control system 10 (e.g., downstream of the compressor 20 and ram air heat exchanger 28). In an embodiment, the dehumidification system 40 further includes a reheater 46. The reheater 46 is another type of heat exchanger configured to increase the temperature of the air as it passes there through. The reheater 46 may be arranged generally upstream from the condenser 42 such that compressed air exiting secondary heat exchange 28 flows through the reheater 46 and then the condenser 42 sequentially.

The air is then directed to the first turbine 30 via a first inlet tube 200' for expansion. After expansion, the air it then again directed through the condenser 42 and then into the second turbine 32 via a second inlet tube 200". The expanded air from the second turbine 32 can be provided to the cabin 36.

Similar to the above, As illustrated, the ECS 10 can also include a bypass or economy valve (ECV) 35. When the ECV 35 is open, the air output from the ram air heat exchanger 28 has a temperature and pressure sufficient to meet the demands of the one or more loads, such as the cabin 36 for example. Accordingly, all or at least a portion of air output from the ram air heat exchanger 28 is configured to bypass including the dehumidification system 40 and the first turbine 30 but not the second turbine 32.

Figure 3:
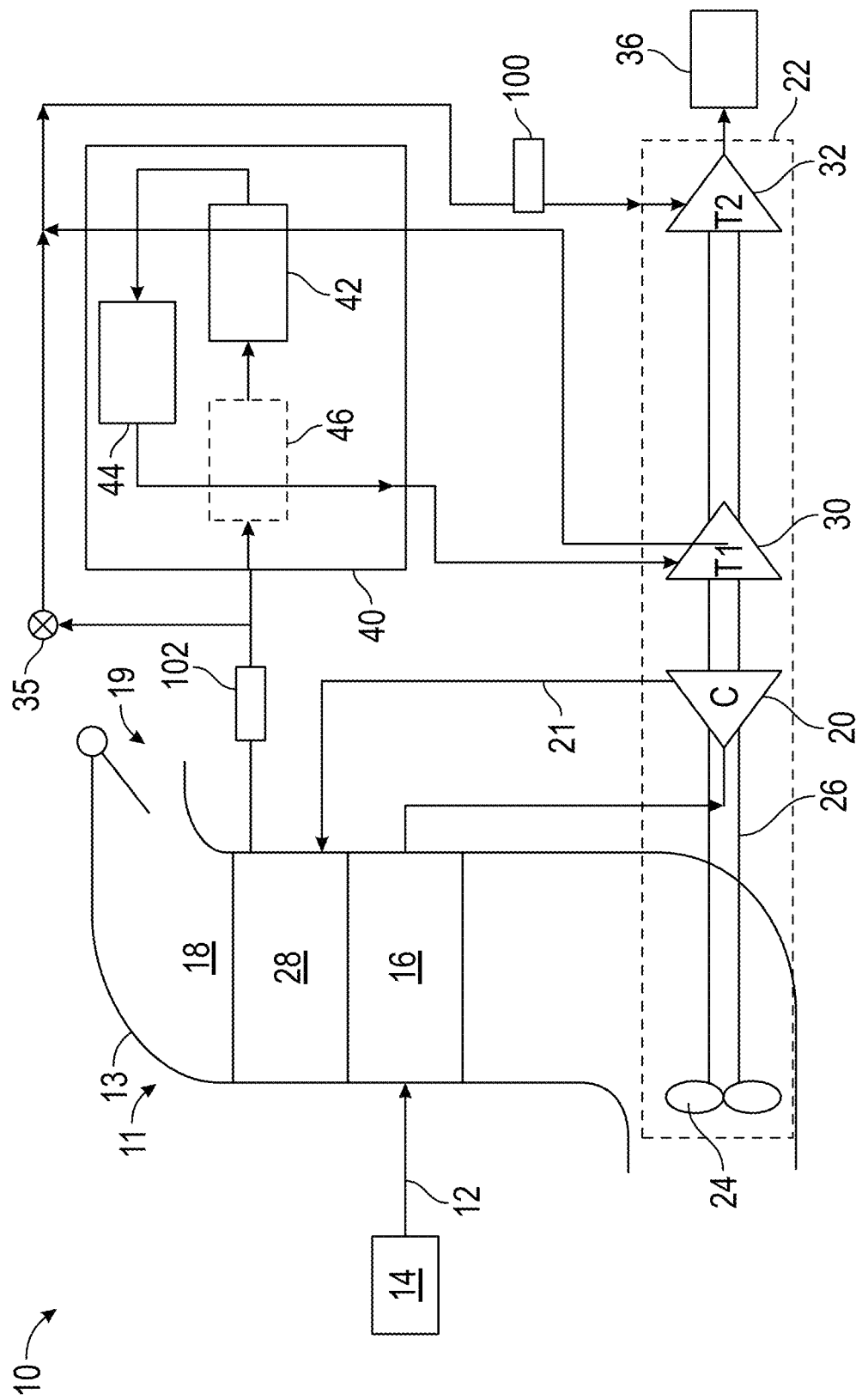
FIG. 3 is a schematic showing an ECS with a humidity sensor according to one embodiment.

In embodiment shown in FIG. 3, the humidity sensor 100 is provided upstream of the second turbine 32. As illustrated, the humidity sensor 100 is directly upstream of the second turbine 32 in the second inlet tube 200" and downstream of the ECV 35. As above, the system of FIG. 3 can operate in normal and bypass modes based on the position of the ECV 35.

In one embodiment, this humidity sensor 100 is the only sensor in the ECS 10. In such an embodiment, the sensor 100 can be said to be in the "second turbine inlet location" on the second inlet tube 200". Measuring humidity in such a position allows the ECS controls to minimize the risk of rotor icing effects in the turbine 32 (e.g., reduce ACM speed if required).

It shall be understood that sensor 100 can be arranged relative to any of turbines herein as shown in FIGS. 2A and 2B.

In the above discussion of FIG. 3, only a single sensor has been shown discussed. It shall be understood that one or more optional additional sensors can be provided. For example, in FIG. 3, an optional second humidity sensor 102 is shown upstream of the dehumidification system 40. As the skilled artisan will realize, having such a second sensor can provide one more advantages. In particular, having two sensors (in addition to the above advantages of a single sensor) can allow for performance measurements of the dehumidification system 40 be used to assess when the dehumidification system is needed and may further provide additional information in support of a root cause failure analysis of a field issue.

While in the above two humidity sensors are shown, additional humidity sensors could also be provided. Further, the location of the sensors could be varied. For example, the first sensor 100 could be moved such that it is in the first inlet tube 200' of the first turbine 30 rather than the second inlet tube 200" of the second turbine 32.

In all embodiments disclosed herein, if two humidity sensors are provided, the dehumidification system 40 can be monitored. For example, the difference in humidity upstream of the dehumidification system 40 measured by the second humidity sensor 102 can be compared to the humidity measured by the first humidity sensor 100. The difference will show the effectiveness of dehumidification system 40 at removing humidity. Further, the values can be tracked over time to see if the effectiveness of dehumidification system 40 at removing humidity is decreasing. Such a decrease may lead to determination that the dehumidification system 40 is failing or needs maintenance or both. Such data can also be used to determine a cause of a failure of the air cycle machine.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An environmental control system of an aircraft, comprising:
   a primary heat exchanger;
   a secondary heat exchanger; and
   an air cycle machine including:
      a compressor fluidly coupled to an outlet of the primary heat exchanger and an inlet of the secondary heat exchanger;
      a dehumidification system arranged in fluid communication with an outlet of the secondary heat exchanger;
      a first turbine fluidly coupled to an outlet of the secondary heat exchanger;
      a second turbine disposed downstream of the first turbine that receives air from the first turbine in a normal mode; and
      a first humidity sensor disposed fluidly between the first turbine and the second turbine that measures humidity of air that has left the first turbine as the air enters the second turbine in the normal mode;
      wherein the first humidity sensor includes an inlet and an exhaust;
      wherein the second turbine receives the air via a second turbine inlet;
      wherein the inlet is connected to the second turbine inlet such that air is directed from the second turbine inlet through the first humidity sensor to the exhaust.

2. The system of claim 1, further comprising:
   a second humidity sensor disposed fluidly between the secondary heat exchanger and the dehumidification system that measures humidity of air that has left the compressor before it enters the dehumidification system.

3. The system of claim 1, wherein the dehumidification system includes a condenser and a water extractor, and moisture is removed from air before entering the first turbine in the normal mode.

4. The system of claim 3, further comprising:
   a second humidity sensor disposed fluidly between the secondary heat exchanger and the dehumidification system that measures humidity of air that has left the compressor before it enters the dehumidification system.

5. The system of claim 3, wherein air exiting the first turbine passes through the condenser before entering the second turbine.

6. The system of claim 1, wherein the exhaust is connected to an output of the second turbine.

7. The system of claim 1, wherein the exhaust is connected to an ambient environment.

8. The system of claim 1, wherein the exhaust includes an exhaust orifice disposed therein that controls a rate of flow through the first humidity sensor.

9. The system of claim 1, further comprising:
   a bypass valve that diverts air around the dehumidification system such that air exiting the first turbine can enter the second turbine without passing though the dehumidification system when in a bypass mode;
   wherein the first humidity sensor is downstream of the bypass valve.

10. An environmental control system of an aircraft, comprising:
    a primary heat exchanger;
    a secondary heat exchanger; and
    an air cycle machine including:
       a compressor fluidly coupled to an outlet of the primary heat exchanger and an inlet of an secondary heat exchanger;
       a dehumidification system arranged in fluid communication with the outlet of the secondary heat exchanger;
       a first turbine fluidly coupled to an outlet of the dehumidification system; and a first humidity sensor disposed fluidly between the secondary heat exchanger and the first turbine that measures humidity of air as the air enters the first in the normal mode;

wherein the first humidity sensor includes an inlet and an exhaust;

wherein the first turbine receives the air via a first turbine inlet;

wherein the inlet is connected to the first turbine inlet such that air is directed from the first turbine inlet through the first humidity sensor to the exhaust.

11. The system of claim 10, further comprising:

a second humidity sensor disposed fluidly between the secondary heat exchanger and the dehumidification system that measures humidity of air that has left the compressor before it enters the dehumidification system.

12. The system of claim 10, wherein the dehumidification system includes a condenser and a water extractor, and moisture is removed from air before entering the first turbine in the normal mode.

13. The system of claim 12, further comprising:

a second humidity sensor disposed fluidly between the secondary heat exchanger and the dehumidification system that measures humidity of air that has left the compressor before it enters the dehumidification system.

14. The system of claim 12, wherein air exiting the first turbine passes through the condenser as it leaves the first turbine.

15. The system of claim 10, wherein the exhaust is connected to an output of the first turbine.

16. The system of claim 10, wherein the exhaust is connected to an ambient environment.

17. The system of claim 10, wherein the exhaust includes an exhaust orifice disposed therein that controls a rate of flow through the first humidity sensor.

18. The system of claim 10, further comprising:

a bypass valve that diverts air around the dehumidification system such that air exiting the secondary heat exchanger can enter the first turbine without passing though the dehumidification system when in a bypass mode;

wherein the first humidity sensor is downstream of the bypass valve.

* * * * *